Oct. 22, 1935. Y. SAKAKURA 2,018,422

PROCESS FOR FROSTING GLASS BULBS IN GRADATION

Filed Aug. 29, 1932

Inventor
Yukitoshi Sakakura
By Raymond A. Robi
Attorney

Patented Oct. 22, 1935

2,018,422

UNITED STATES PATENT OFFICE 2,018,422

PROCESS FOR FROSTING GLASS BULBS IN GRADATION

Yukitoshi Sakakura, Shibuya Machi, Toyotama Gun, Tokyo Fu, Japan

Application August 29, 1932, Serial No. 630,840

1 Claim. (Cl. 41—42)

My invention relates to improvements in processes for internally frosting incandescent lamp bulbs in gradation, said process consisting in the glass bulb being filled with a frosting solution such as an alkaline hydrogen fluoride which acts lively on glass when heated. A heat conveying fluid in which the bulb is dipped is heated at the bottom to cause convection currents in the vessel and owing to the difference of temperature of the convecting fluid acting on the surface of the glass bulb the inner side of the same is frosted in gradation, that is to say heavily frosted at the body part and gradually decreasing toward the neck the outer end of which is left quite transparent.

The object of the invention is to frost glass bulbs in gradation easily by using a frosting solution which acts lively on glass when heated and by causing the convection of a fluid outside the bulb.

In the process for frosting glass bulbs hitherto known in the art the entire surface of the bulb is frosted uniformly either by chemical or mechanical means, and it is really difficult or troublesome to frost an incandescent lamp bulb so as to gradually fade out at the transparent part. According to the present invention such frosting may be easily attained by combined chemical and physical means.

In carrying out the present invention a frosting solution such as hydrogen fluoride of sodium is used. The glass bulb when filled with the frosting solution is dipped in a vessel of water or any other heat conveying fluid. The fluid outside the bulb is bottom heated to cause convection currents in the vessel. The surface of the glass bulb directly facing the hot convection current of the fluid is heavily frosted, while the other surface which does not directly come in contact with the said current is comparatively unaffected, whereby the bulb is frosted in gradation.

Figure 2:
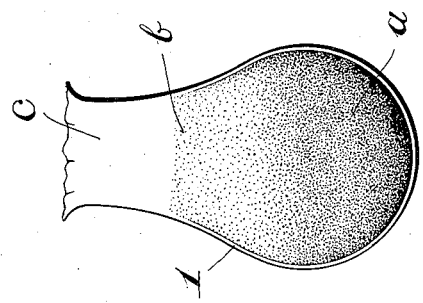
Figure 1:
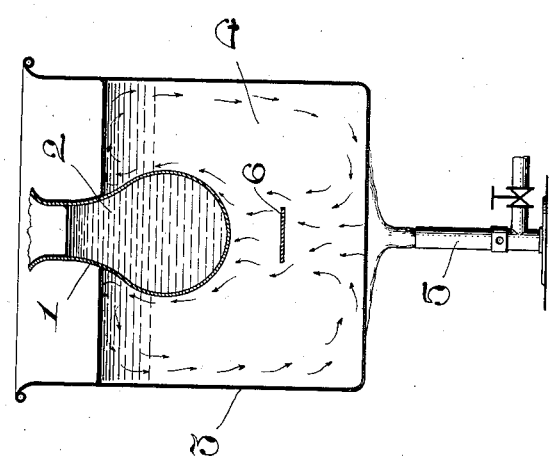

The accompanying drawing shows an embodiment of the present invention. Fig. 1 is a longitudinal sectional view showing the state of the glass bulb being frosted inside. Fig. 2 is an elevation of the glass bulb frosted in gradation according to the present invention.

According to Fig. 1, the glass bulb 1 is filled with solution of hydrogen fluoride of sodium ($NaHF_2$) 2, and the bulb is vertically dipped in the vessel 3 filled with water or any other heat conveying fluid 4. The vessel 3 is heated at the bottom by the burner 5, and the hot fluid in the vessel rises by convection currents as shown by the arrows in the figure. The lower side of the glass bulb 1, from its bottom up to the maximum horizontal diameter, directly in contact with the ascending convection currents is heated comparatively at a high temperature, while its upper side, from the maximum horizontal diameter up to the part of the neck, indirectly heated is kept at a comparatively lower temperature. The frosting solution 2 in the bulb 1, therefore, acts more intensely on the glass bulb at its body part while comparatively less at the neck part. The frosting solution 2 itself also causes convection in the bulb 1 in some degree, but at the upper part of the neck which appears out of the fluid 3 the heat being rapidly diffused into air the solution acts very slowly on the glass. The inner surface of the glass at the upper part of the neck which is not touched by the frosting solution 2 becomes also slightly frosted by the solution vapors. Thus the glass bulb 1 becomes heavily frosted at the body part $a$ and gradually diminishes toward the neck $b$, leaving quite transparent the part $c$ at the top of the neck, as shown in Fig. 3.

The concentration of hydrogen fluoride of sodium used in the above procedure is found to give a good result when 150 grm. of hydrogen fluoride of sodium is dissolved in 200 c. c. of water. The temperature of water outside the bulb is kept at or near the boiling point and a proper degree of frosting may be obtained when the temperature of the frosting solution inside the bulb is at 60° C. or thereabout. The solution of hydrogen fluoride of sodium at the above concentration acts very slightly on glass at ordinary temperature but its frosting power is considerably accelerated attending with the rise of temperature. By using the solution of hydrogen fluoride of sodium very fine grains at the frosted surface of glass may be obtained, whereby the weakening of the bulb by frosting which is inevitable in hitherto known art is avoided, so that any subsequent treatment for strengthening the bulb by rounding off the sharp crevices the coarsely frosted surface may be omitted according to the present process. The present process may also be applied to bulbs which have been frosted to some degree by any known methods.

When the bottom part of the bulb 1 tends to frost excessively, a screen 6 is preferably interposed between the bulb 1 and the bottom of the vessel 3 to restrict the convection of water at the central part. By properly adjusting the area and position of the screen or by using a screen made of a perforated plate or of a wire netting, the bottom part of the glass bulb may be frosted to correspond to that of the maximum horizontal diameter or the whole body part a. It is to be understood that the form of my invention herein shown and described is to be taken as a preferred example of the same and that various changes as to the shape, size and arrangement of parts may be resorted to without departing from the spirit of the invention or the scope of the subjoined claim.

Having now particularly described and ascertained the nature of my said invention and in what manner the same is to be performed I declare that what I claim is:—

Improvements in glass bulbs frosting process, consisting in filling a glass bulb with a solution of hydrogen fluoride of sodium, vertically dipping the bulb in a heat conveying liquid, and heating the liquid at the bottom to cause convection currents, whereby said bulb is frosted in gradation at its inner side and a transparent portion left at the top of the neck.

YUKITOSHI SAKAKURA.